US012084917B2

(12) United States Patent
Wernberg et al.

(10) Patent No.: US 12,084,917 B2
(45) Date of Patent: Sep. 10, 2024

(54) STEPLADDER TRAY

(71) Applicant: Tricam Industries, Inc., Eden Prairie, MN (US)

(72) Inventors: Benjamin M. Wernberg, Savage, MN (US); Joseph P. Foley, St. Paul, MN (US); Dennis D. Simpson, Plymouth, MN (US); Benjamin P. Williams, Chaska, MN (US)

(73) Assignee: Tricam Industries, Inc., Eden Prairie, MN (US)

( * ) Notice: Subject to any disclaimer, the term of this patent is extended or adjusted under 35 U.S.C. 154(b) by 606 days.

(21) Appl. No.: 16/788,655

(22) Filed: Feb. 12, 2020

(65) Prior Publication Data

US 2021/0246725 A1 Aug. 12, 2021

(51) Int. Cl.
*E06C 7/14* (2006.01)
*E06C 1/14* (2006.01)
*E06C 7/48* (2006.01)
*B25H 3/06* (2006.01)

(52) U.S. Cl.
CPC .................. *E06C 7/14* (2013.01); *E06C 1/14* (2013.01); *E06C 7/48* (2013.01); *B25H 3/06* (2013.01)

(58) Field of Classification Search
CPC ..... E06C 7/14; E06C 7/48; E06C 1/14; B25H 3/06; B25H 3/003; B25H 3/023; B25H 3/025
USPC ........................................ 108/157.18, 157.16
See application file for complete search history.

(56) References Cited

U.S. PATENT DOCUMENTS

| | | | | | |
|---|---|---|---|---|---|
| 768,364 | A * | 8/1904 | Hines | B65D 21/0204 | 248/210 |
| 2,485,413 | A * | 10/1949 | Ross | B60R 3/007 | 182/201 |
| 2,865,546 | A | 12/1958 | Shull | | |
| 2,957,542 | A | 10/1960 | Rizzuto | | |
| 3,625,388 | A | 12/1971 | Golden et al. | | |
| 3,744,591 | A | 7/1973 | Lucci et al. | | |
| 4,452,484 | A * | 6/1984 | Pastor | A61H 3/00 | 297/150 |
| 4,502,564 | A | 3/1985 | Kümmerlin et al. | | |
| 4,586,586 | A * | 5/1986 | Canals | E06C 7/081 | 182/118 |
| 4,589,521 | A * | 5/1986 | Finster | E06C 7/14 | D25/68 |
| 4,653,713 | A * | 3/1987 | Hamilton | B25H 3/02 | D32/53.1 |
| 4,706,918 | A * | 11/1987 | Wilson | E06C 7/14 | 182/120 |
| 4,730,802 | A * | 3/1988 | Chatham | B25H 3/06 | 248/238 |
| 4,936,463 | A | 6/1990 | Tiramani | | |
| 4,979,590 | A | 12/1990 | Bailey | | |
| 5,035,389 | A * | 7/1991 | Wang | F16M 11/041 | 248/225.11 |
| 5,052,581 | A | 10/1991 | Christ et al. | | |

(Continued)

*Primary Examiner* — Colleen M Chavchavadze
*Assistant Examiner* — Shiref M Mekhaeil

(57) ABSTRACT

A tray for a stepladder is disclosed. The tray provides an area for work space or for storage of tools or materials in addition to that provided by the stepladder by itself. The tray is configured to be removably attachable to the top of the stepladder when in use or removably attached to the stepladder and preferably within the boundaries of the stepladder when not in use.

10 Claims, 20 Drawing Sheets

(56) References Cited

U.S. PATENT DOCUMENTS

| | | | | | |
|---|---|---|---|---|---|
| 5,120,013 | A * | 6/1992 | Sweeney | E06C 1/393 | 248/210 |
| 5,240,214 | A * | 8/1993 | Birnbaum | F16M 11/12 | 248/214 |
| 5,337,857 | A * | 8/1994 | Spalt | E06C 7/165 | 182/120 |
| 5,370,263 | A * | 12/1994 | Brown | E06C 7/14 | 220/756 |
| 5,421,428 | A * | 6/1995 | Ingles | E06C 7/14 | 182/230 |
| 5,573,081 | A | 11/1996 | Bartnicki et al. | | |
| 5,584,357 | A * | 12/1996 | Gugel | E06C 7/182 | 248/238 |
| 5,613,574 | A | 3/1997 | Melanson | | |
| 5,622,010 | A * | 4/1997 | Weber | A47F 5/0846 | 211/88.01 |
| 5,624,126 | A * | 4/1997 | Vosbikian | B25H 5/00 | 280/32.6 |
| 5,673,885 | A | 10/1997 | Pham | | |
| 5,722,507 | A | 3/1998 | Kain | | |
| 5,740,883 | A * | 4/1998 | Trank | E06C 7/14 | 248/210 |
| 5,782,314 | A * | 7/1998 | Zeitler | E06C 7/14 | 248/210 |
| 5,855,346 | A * | 1/1999 | Hall | E06C 7/14 | 248/210 |
| 5,873,433 | A * | 2/1999 | Katz | E06C 7/14 | 248/210 |
| 5,913,380 | A * | 6/1999 | Gugel | E06C 7/14 | 248/210 |
| 6,098,748 | A * | 8/2000 | Harper, Jr. | E06C 7/14 | 206/372 |
| 6,401,862 | B1 * | 6/2002 | Caron | E06C 7/14 | 182/120 |
| 6,443,260 | B1 * | 9/2002 | Katz | E06C 7/14 | 248/238 |
| 6,467,577 | B1 | 10/2002 | Charlebois, Jr. | | |
| 6,883,529 | B2 * | 4/2005 | Kvaternik | A61H 3/00 | 135/66 |
| 6,902,034 | B2 | 6/2005 | Gibson et al. | | |
| 7,000,732 | B1 | 2/2006 | Briggs, Jr. | | |
| 7,032,711 | B1 * | 4/2006 | Katz | B25H 3/06 | 248/238 |
| 7,063,187 | B1 * | 6/2006 | Lavigne | E06C 1/39 | 248/238 |
| 7,108,103 | B2 | 9/2006 | Meeker | | |
| 7,128,187 | B2 * | 10/2006 | Simpson | E06C 7/14 | 182/129 |
| D541,432 | S * | 4/2007 | Rapp | D25/68 | |
| 7,370,726 | B1 * | 5/2008 | Chavez | E06C 1/18 | 248/210 |
| 7,415,933 | B2 * | 8/2008 | Sagol | B25H 1/04 | 108/115 |
| 7,648,108 | B2 * | 1/2010 | Peterson | A61B 17/54 | 132/73 |
| 7,886,872 | B2 * | 2/2011 | Astor | E06C 7/14 | 182/129 |
| 7,967,111 | B2 | 6/2011 | Meyers et al. | | |
| D642,283 | S | 7/2011 | Ericksson | | |
| 8,083,111 | B2 * | 12/2011 | Lase | B60R 9/065 | 224/400 |
| 8,186,481 | B2 * | 5/2012 | Moss | E06C 7/16 | 182/25 |
| 8,272,478 | B2 * | 9/2012 | Astor | E06C 7/14 | 248/238 |
| 8,453,796 | B2 * | 6/2013 | Astor | E06C 7/00 | 182/119 |
| 8,579,083 | B2 * | 11/2013 | Astor | E06C 7/14 | 182/115 |
| 8,596,454 | B1 * | 12/2013 | Carlson | B25H 3/06 | 248/210 |
| 9,045,940 | B2 * | 6/2015 | Walters | E06C 7/143 | |
| 9,309,718 | B1 | 4/2016 | Matthew | | |
| 9,428,958 | B1 * | 8/2016 | Ellis | E06C 7/14 | |
| 9,714,541 | B2 * | 7/2017 | Astor | E06C 7/14 | |
| 9,714,542 | B1 * | 7/2017 | Harcz | E06C 7/14 | |
| 9,850,706 | B2 * | 12/2017 | Astor | E06C 7/14 | |
| D833,643 | S * | 11/2018 | Foley | D25/68 | |
| 10,138,680 | B2 * | 11/2018 | Williams | E06C 7/14 | |
| 10,184,292 | B2 * | 1/2019 | Latimer | E06C 1/18 | |
| 10,208,538 | B2 * | 2/2019 | Astor | E06C 1/18 | |
| 10,619,416 | B1 * | 4/2020 | Snell | E06C 7/06 | |
| 10,633,918 | B2 * | 4/2020 | Wulfekotte | E06C 1/20 | |
| 10,648,234 | B2 * | 5/2020 | Skubic | E06C 1/393 | |
| 10,709,238 | B1 * | 7/2020 | Thompson | A47B 96/066 | |
| 10,801,263 | B2 * | 10/2020 | Dangrow | E06C 7/48 | |
| 11,167,407 | B2 * | 11/2021 | McGee | B25H 3/02 | |
| 2002/0017430 | A1 * | 2/2002 | Rosko | E06C 1/393 | 248/238 |
| 2002/0104709 | A1 | 8/2002 | Hines | | |
| 2003/0029676 | A1 | 2/2003 | Gibson | | |
| 2006/0006024 | A1 | 1/2006 | Till | | |
| 2007/0120028 | A1 | 5/2007 | Kane | | |
| 2007/0163837 | A1 * | 7/2007 | Dyer | E06C 7/14 | 182/129 |
| 2007/0193829 | A1 * | 8/2007 | Astor | E06C 1/18 | 182/129 |
| 2007/0284191 | A1 * | 12/2007 | Astor | E06C 7/00 | 182/129 |
| 2009/0078504 | A1 * | 3/2009 | Astor | E06C 1/39 | 182/129 |
| 2009/0272602 | A1 | 11/2009 | Kocher | | |
| 2010/0224445 | A1 | 9/2010 | Moss et al. | | |
| 2012/0211305 | A1 | 8/2012 | Moss et al. | | |
| 2012/0217093 | A1 * | 8/2012 | Latimer | E06C 7/14 | 182/129 |
| 2012/0228059 | A1 | 9/2012 | Lampe et al. | | |
| 2013/0146394 | A1 * | 6/2013 | Astor | E06C 7/14 | 182/129 |
| 2013/0270037 | A1 | 10/2013 | Pensieri | | |
| 2014/0326538 | A1 * | 11/2014 | Najey | E06C 7/08 | 182/129 |
| 2015/0014094 | A1 | 1/2015 | Brooks | | |
| 2015/0090533 | A1 | 4/2015 | Moss et al. | | |
| 2016/0024845 | A1 | 1/2016 | Coe | | |
| 2016/0038789 | A1 | 2/2016 | Cheyne | | |
| 2016/0177626 | A1 | 6/2016 | Miller | | |
| 2016/0348434 | A1 * | 12/2016 | Williams | E06C 7/14 | |
| 2017/0251826 | A1 * | 9/2017 | Sclare | A47D 1/008 | |
| 2017/0328131 | A1 * | 11/2017 | Woodward | E06C 1/393 | |
| 2020/0170419 | A1 * | 6/2020 | Sclare | A47D 1/04 | |
| 2020/0270946 | A1 * | 8/2020 | Lawery | B44D 3/125 | |
| 2021/0037989 | A1 * | 2/2021 | Rogers | A47D 1/04 | |

* cited by examiner

A – A

STEPLADDER TRAY

TECHNICAL FIELD

The present invention relates to a detachable tray for use with a stepladder that provided additional space at the top of the stepladder, but may be conveniently stored within the boundaries of the stepladder when not in use.

BACKGROUND

Ladders, step stools, and stepladders are generally known in the art. Kummerlin, U.S. Pat. No. 4,502,564, discloses a foldable step ladder. Because of their desired portability, foldable stepladders often include handles and other features that make them easier to transport. Lucci, U.S. Pat. No. 3,744,591, discloses a portable, folding stepladder.

When working on a ladder, step stool, or stepladder, it is often desirable to have tools, paint, and other necessary objects within easy reach. For example, it is known to removably attach a paint roller tray to the rung of a ladder to more easily paint a ceiling or other area requiring a ladder. Golden, U.S. Pat. No. 3,625,388, discloses a paint tray particularly useful with an upright ladder.

Utility trays for use with ladder, step stool, or stepladder are also known in the art. Pham, U.S. Pat. No. 5,673,885, discloses a paint tray for a stepladder for storing work materials, tools and a paint bucket that is held onto the stepladder by retaining means. Melanson, U.S. Pat. No. 5,613,574, discloses a stepladder mounted tool holster and parts tray that removably clamps onto the top step of a stepladder. Katz et al., U.S. Pat. No. 6,443,260, discloses a stepladder tray pivotally attached to the top cap of a step-ladder for supporting tools and the like. Christ et al., U.S. Pat. No. 5,052,581, discloses a detachable ladder support tray for supporting tools and paint containers. Improvements to add to the amount of space available at the top of a stepladder include U.S. Pat. No. 10,138,680 to Williams, et al., for a hinged tray for a ladder or step stool.

It is often inconvenient, however, to use a removable tool or paint tray with a ladder or step stool. In some instances, the tray may be difficult to attach or remove from the ladder or step stool depending on the configuration of the top cap of the ladder or step stool. The removable tray and ladder, step stool, or stepladder usually must be stored separately, taking up additional space. Additionally, to move a ladder, step stool, or stepladder from place to place, the tray may need to be removed and carried separately because of weight or awkward transport configuration.

There is a need in the industry to have tray that can be removably attached to a ladder, step stool, or stepladder to hold tools and hardware, but can be removed and stored within the boundaries of the ladder, step stool, or stepladder.

SUMMARY

In embodiments, a detachable tray for ladder, step stool, or stepladder is disclosed. The tray allows for a larger work area on the top of a ladder, step stool, or stepladder while the tray can be removed and stored within the boundaries of the closed ladder, step stool, or stepladder. The tray provides a larger and deeper work and storage area than prior art ladder, step stool, or stepladder trays without increasing storage space requirements. The tray can still be used as work area for holding tools and hardware when the ladder, step stool, or stepladder is in the closed position. The tray includes prongs that fit into prong slots on the top cap of the ladder, step stool, or stepladder to easily secure the tray to the top cap and to remove the tray from the top cap when not in use. The invention also includes stud slots on the tray that correspond to tray storage studs located on the ladder, step stool, or stepladder to store the tray when not in use. The tray can be removably attached and detached to both the top cap for use or to the ladder, step stool, or stepladder for storage by any means known in the art.

It is an object of the invention to provide a removable tray for the top of a ladder, step stool, or stepladder. It is another object of the invention to provide a tray that does not increase the footprint of the ladder, step stool, or stepladder to eliminate any impact on storing of the ladder, step stool, or stepladder from having the utility of a tray. It is a further object of the invention to provide access to the tray at the top of the ladder, step stool, or stepladder without having to reach over and beyond the top of the ladder, step stool, or stepladder.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
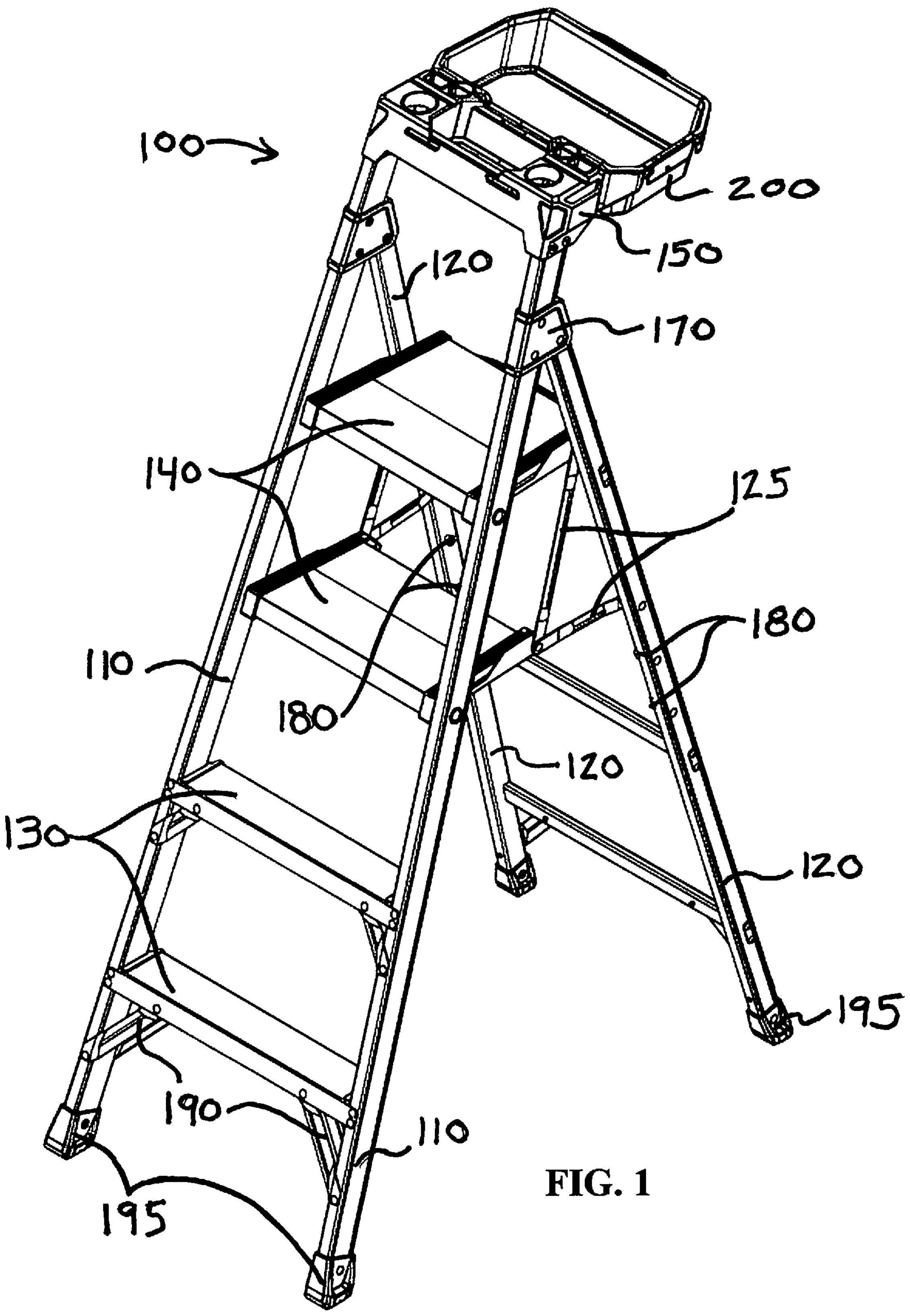
FIG. 1 is an isometric view of a stepladder in the in-use position incorporating an embodiment of the invention.
Figure 2:
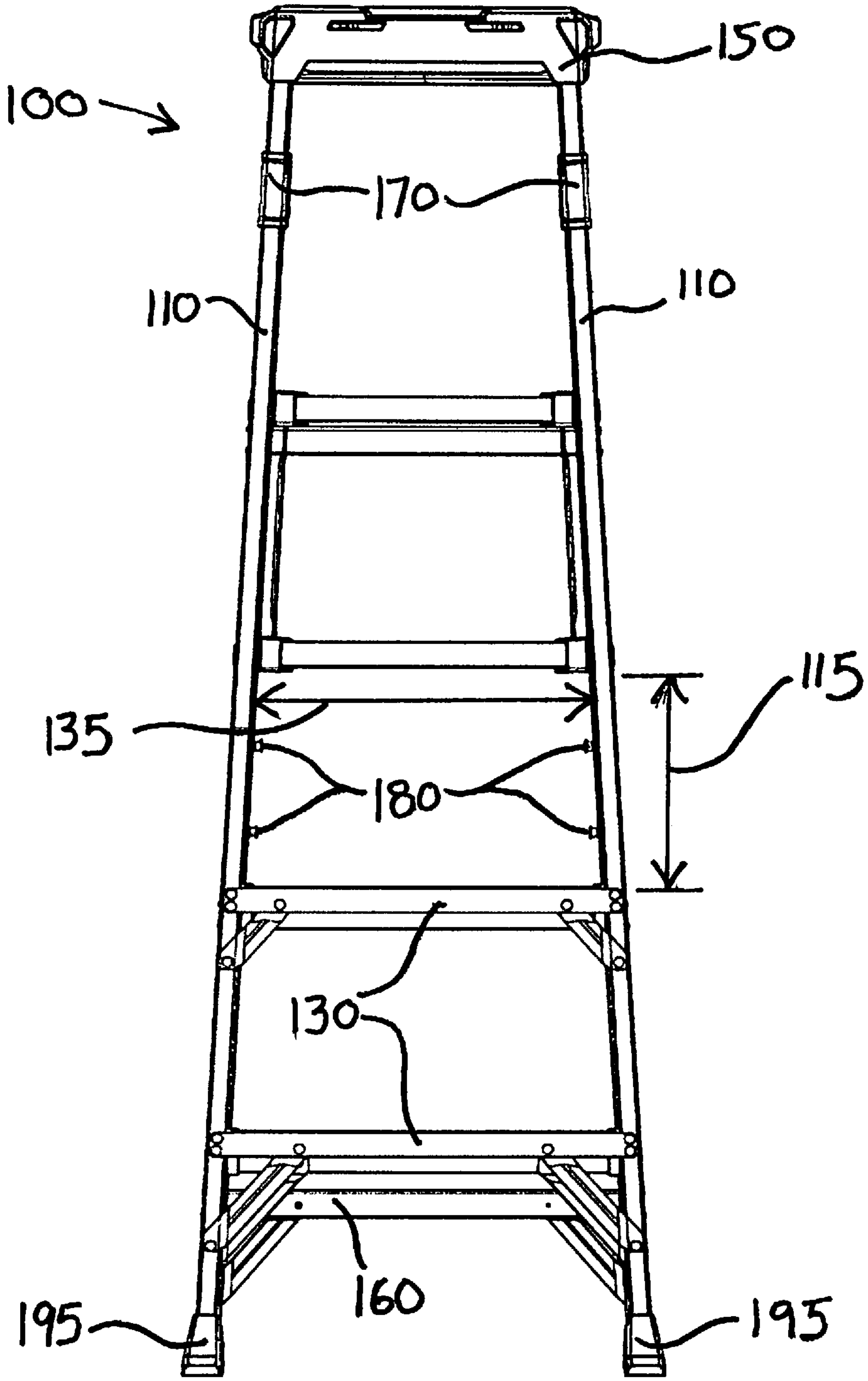
FIG. 2 is a front elevation view of the stepladder of FIG. 1.
Figure 3:
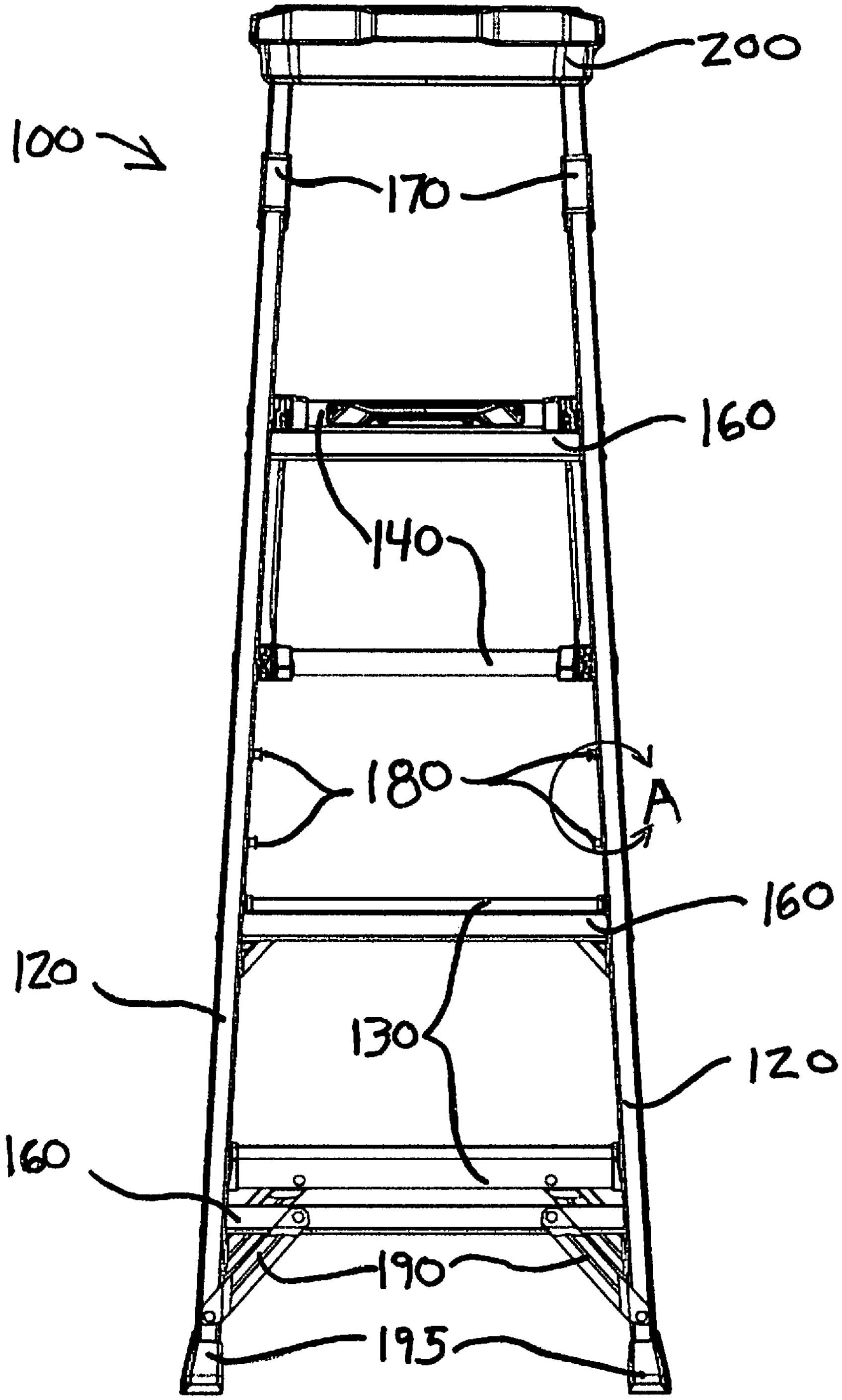
FIG. 3 is a rear elevation view of the stepladder of FIG. 1.
Figure 4:
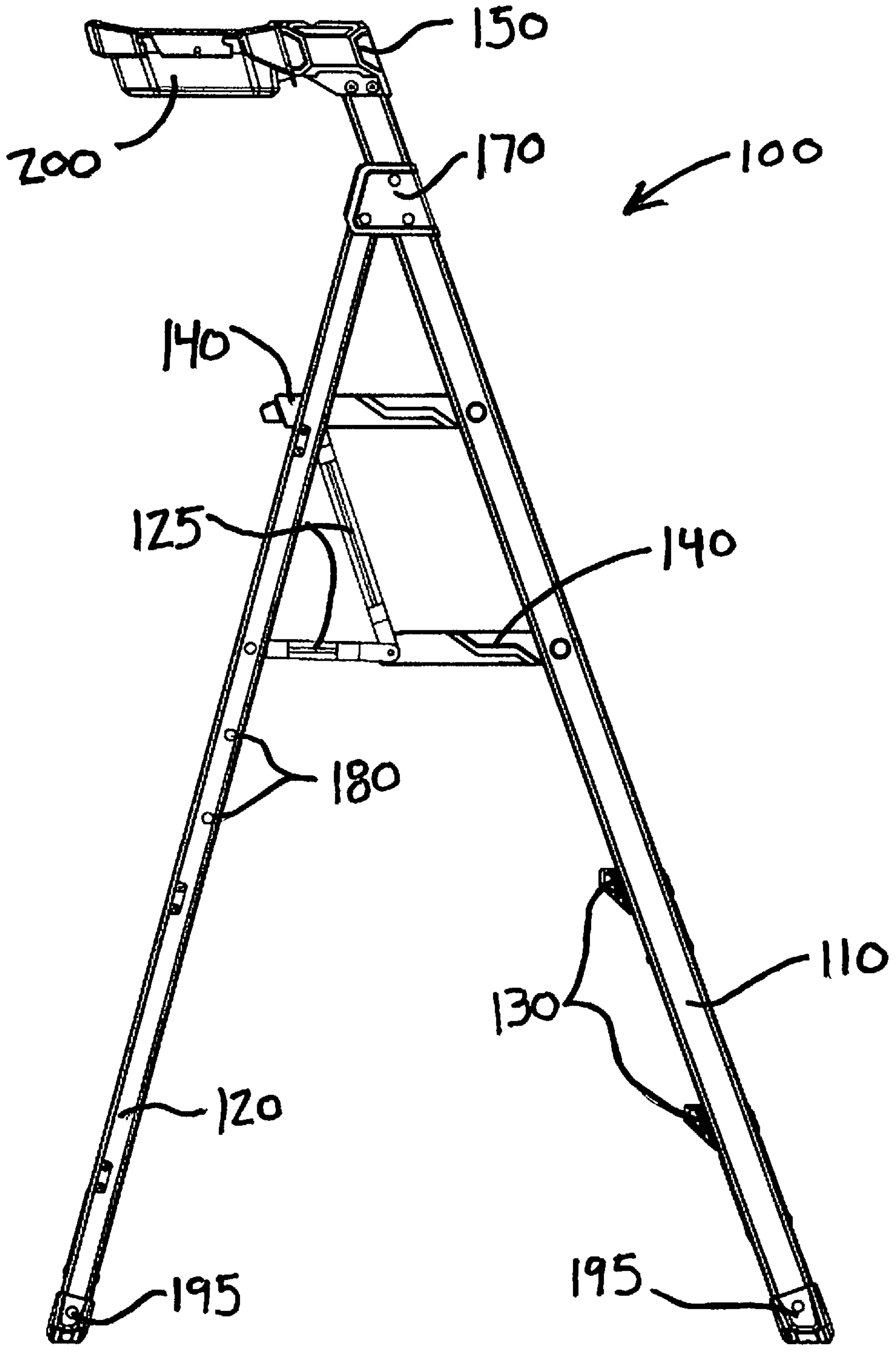
FIG. 4 is a left side elevation view of the stepladder of FIG. 1.
Figure 5:
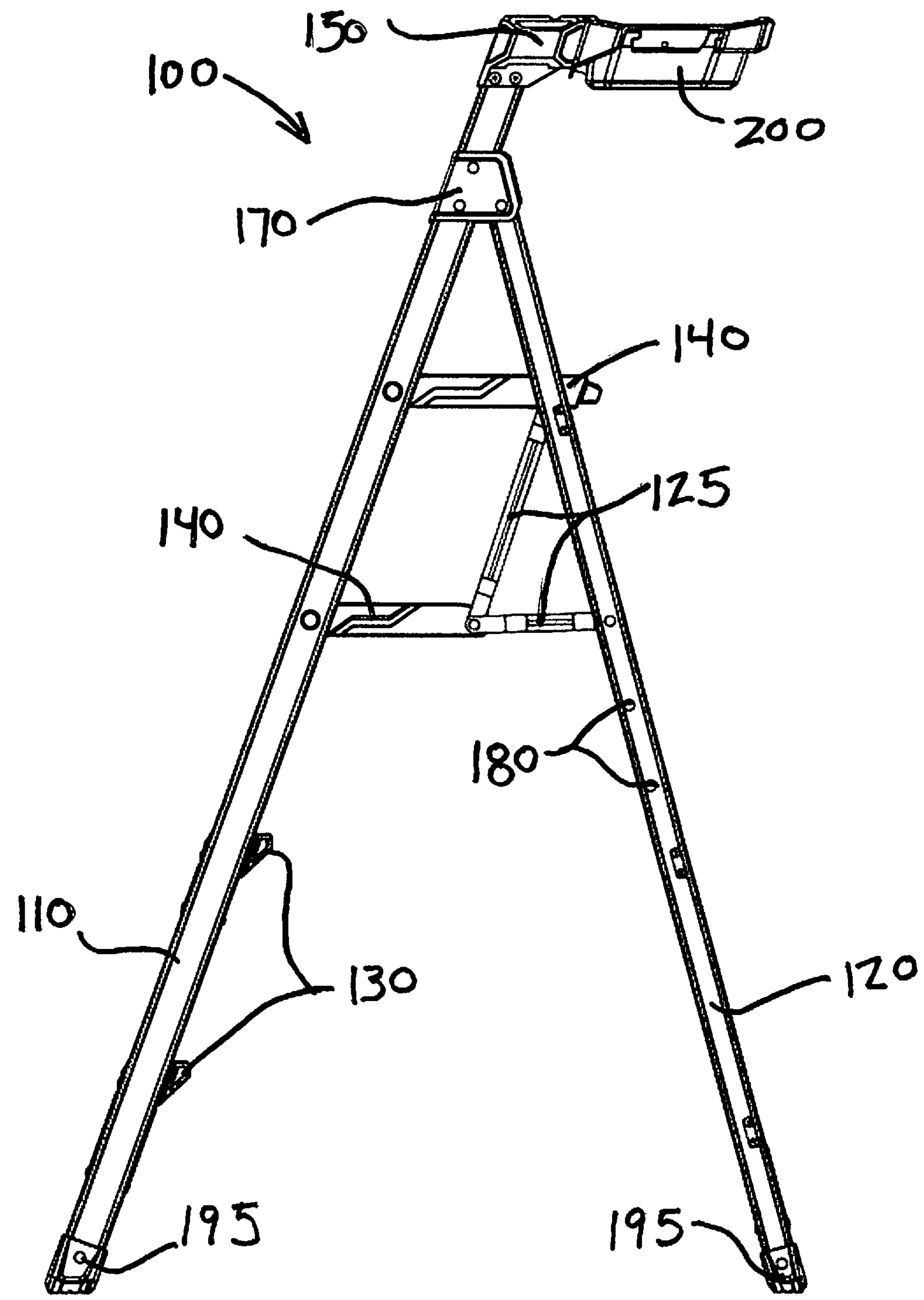
FIG. 5 is a right side elevation view of the stepladder of FIG. 1.
Figure 6:
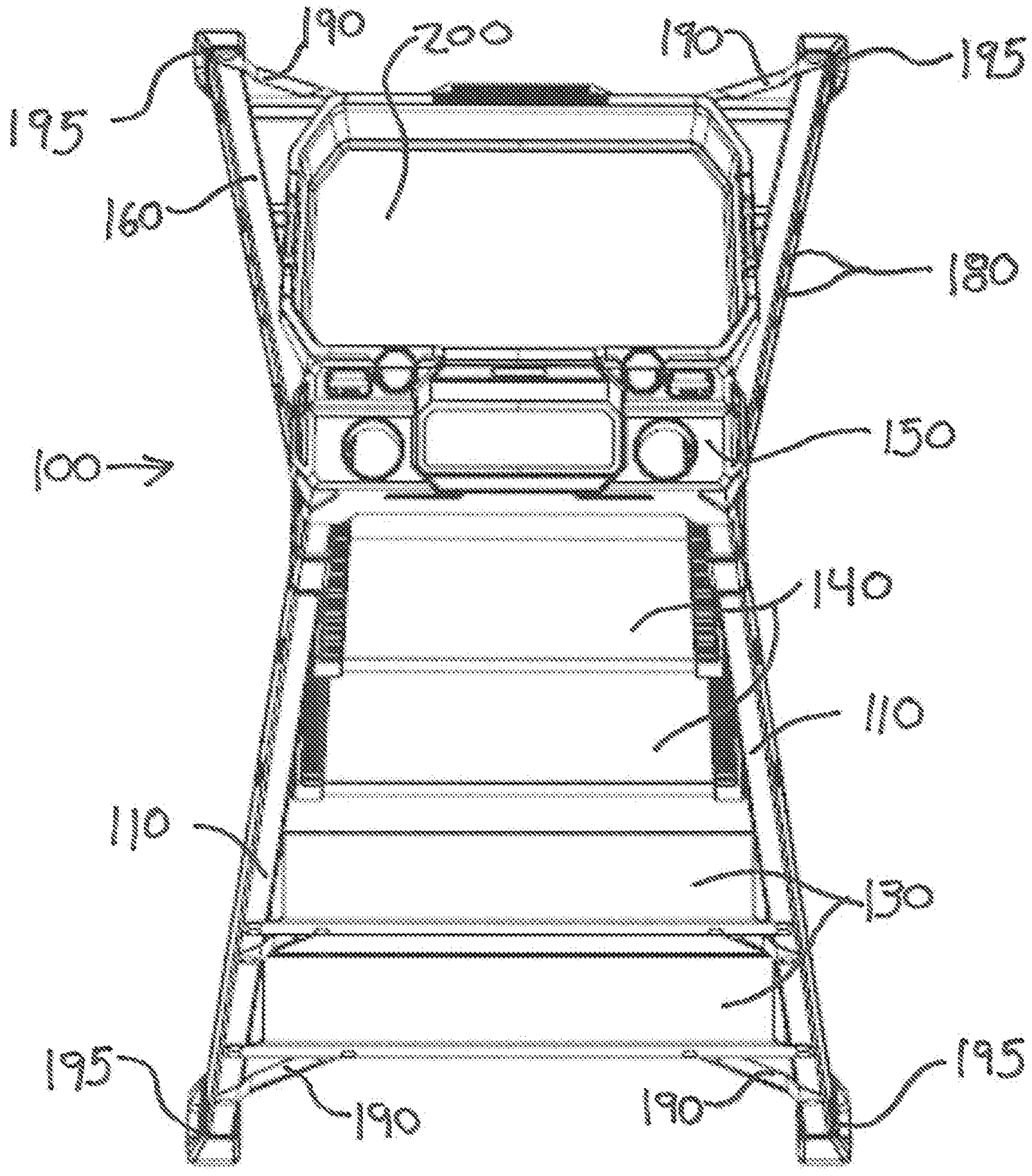
FIG. 6 is a top view of the stepladder of FIG. 1.
Figure 7:
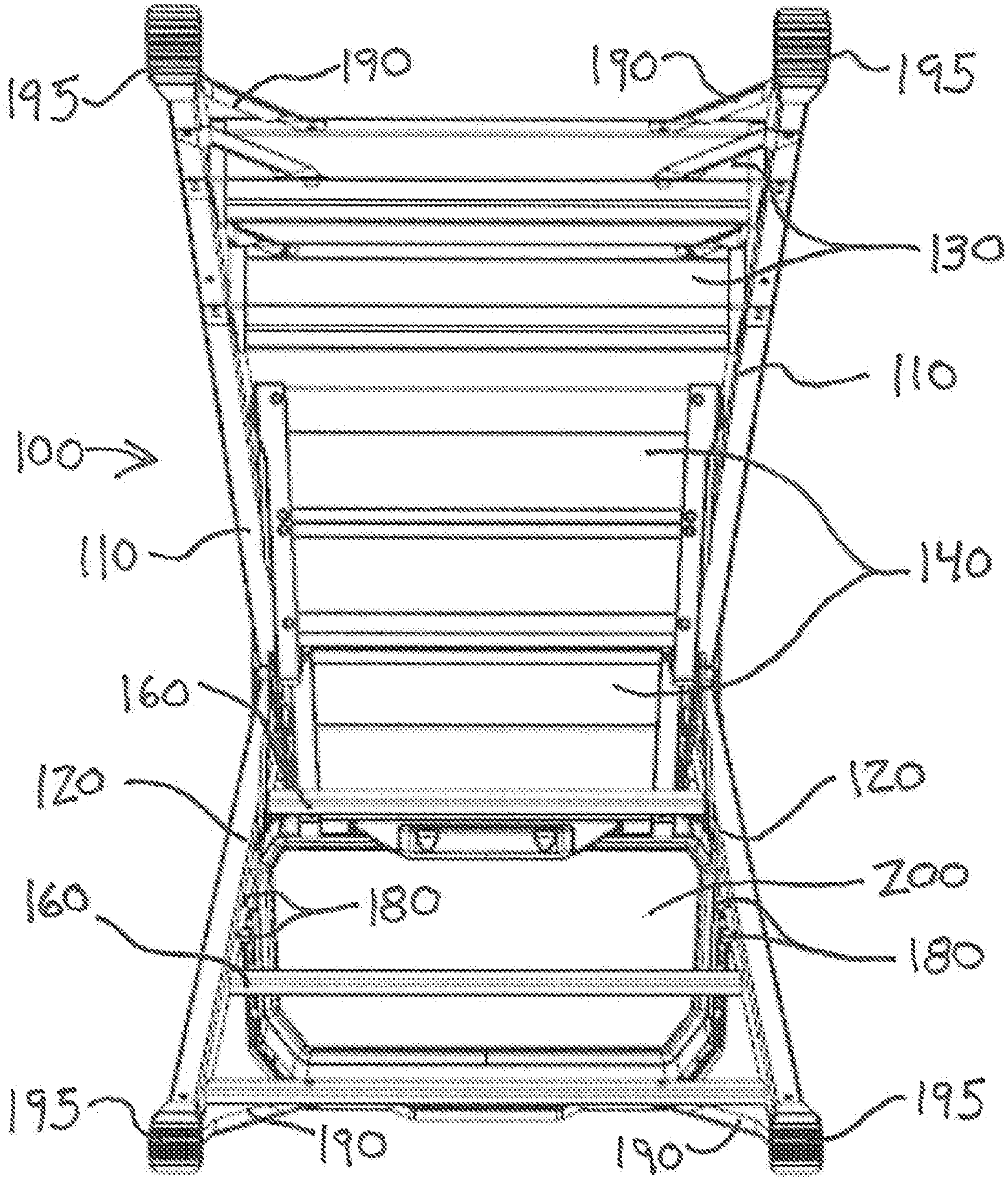
FIG. 7 is a bottom view of the stepladder of FIG. 1.
Figure 8:
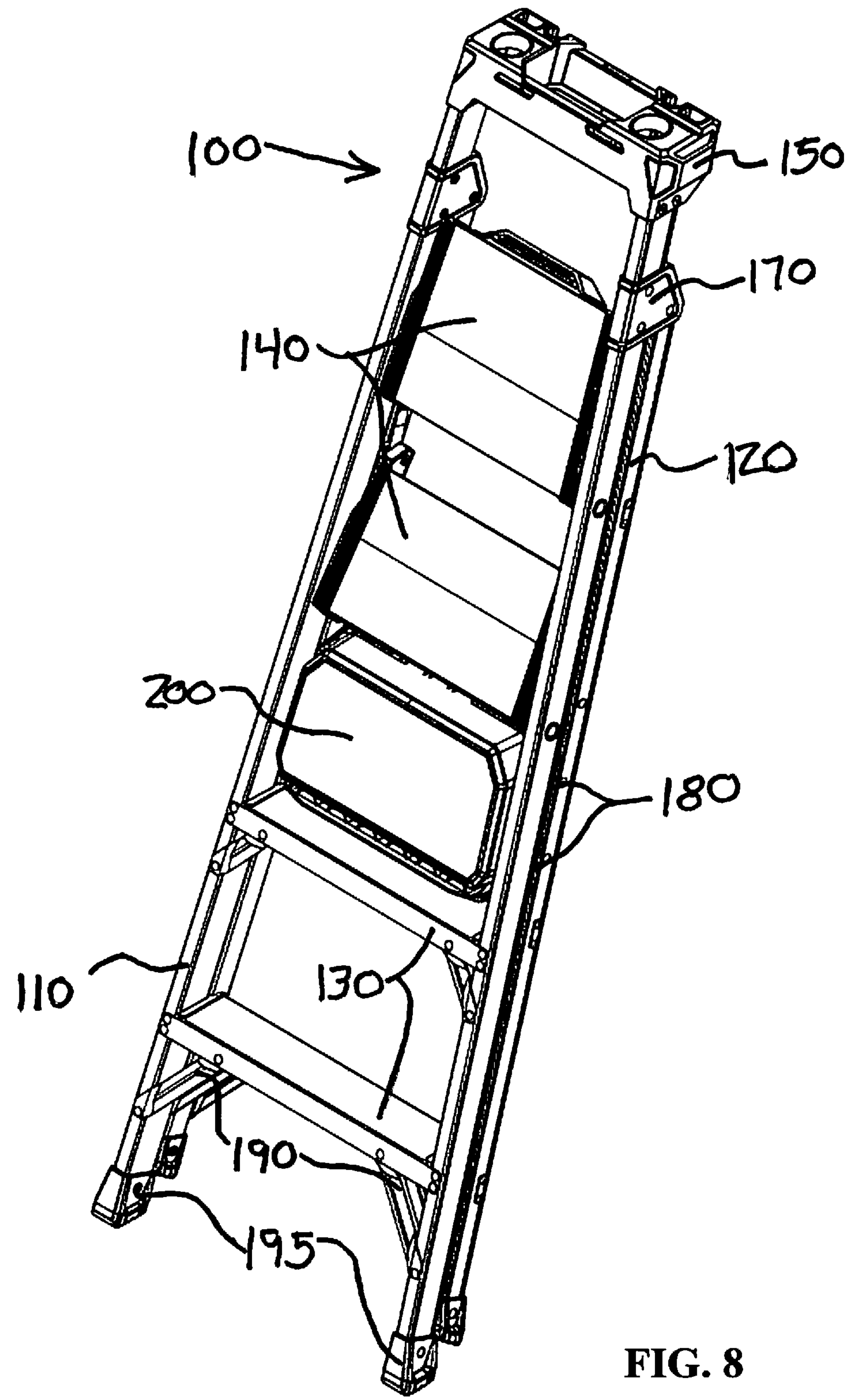
FIG. 8 is an isometric view of a stepladder in the closed position incorporating an embodiment of the invention.
Figure 9:
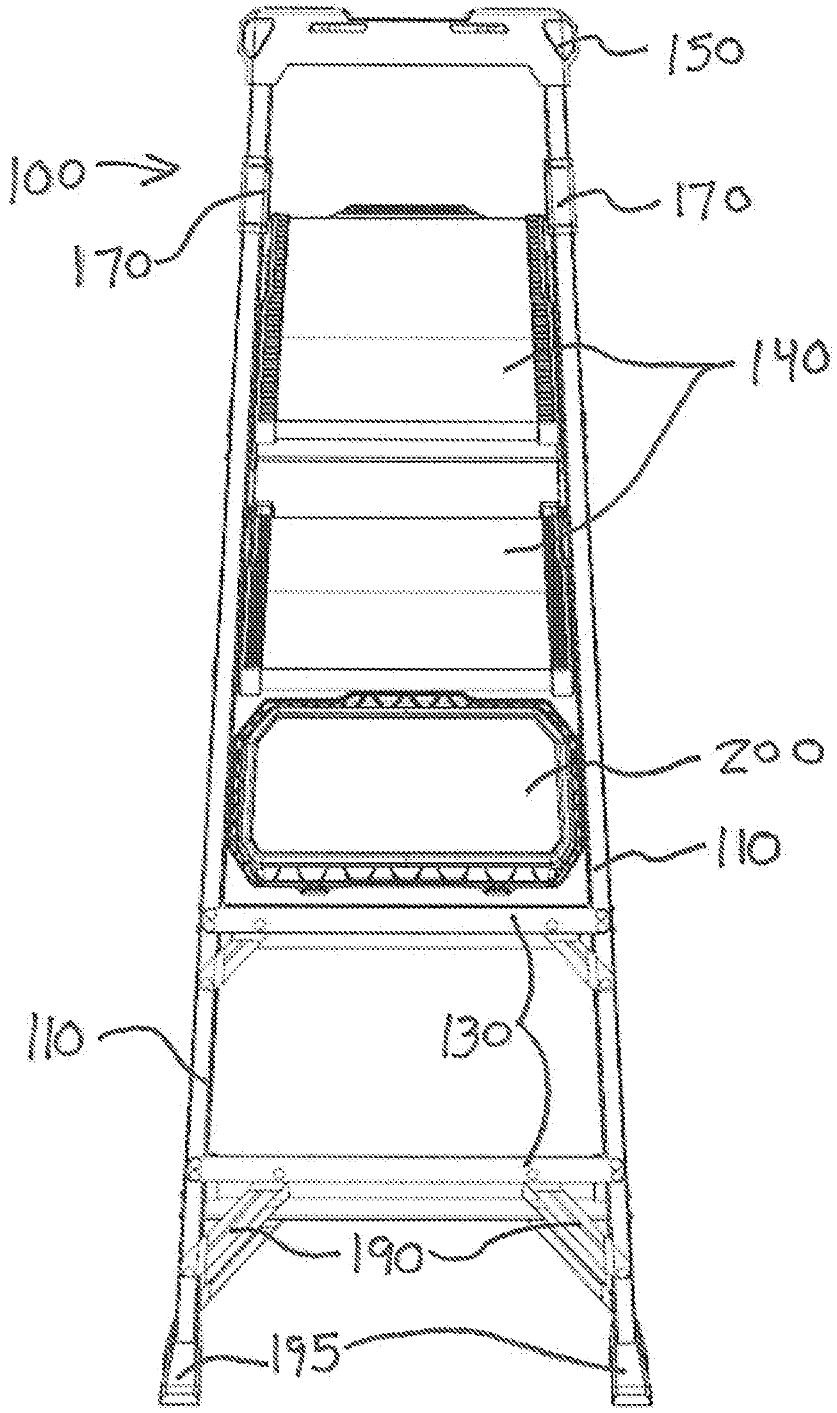
FIG. 9 is a front elevation view of the stepladder of FIG. 8.
Figure 10:
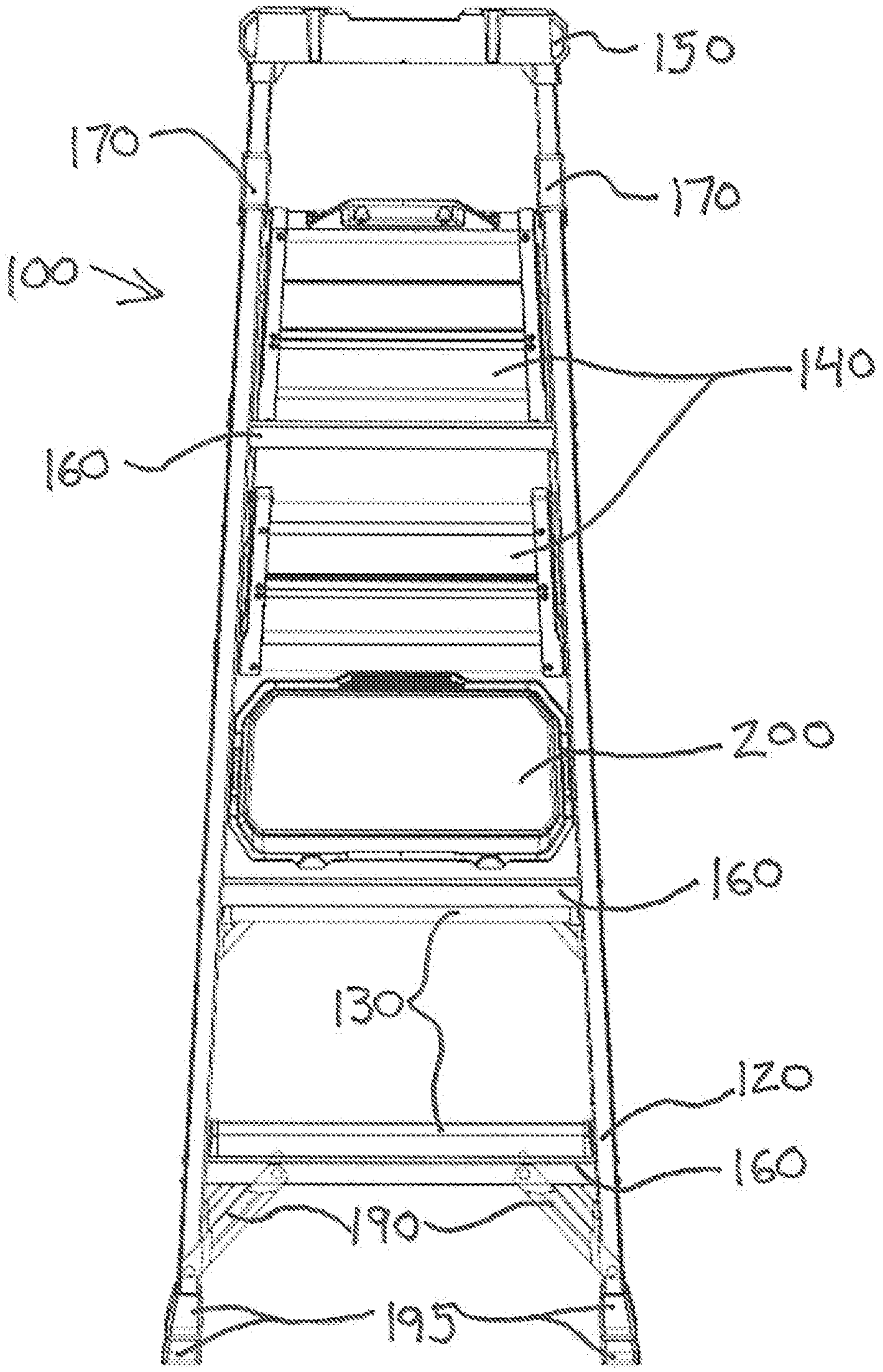
FIG. 10 is a rear elevation view of the stepladder of FIG. 8.
Figure 11:
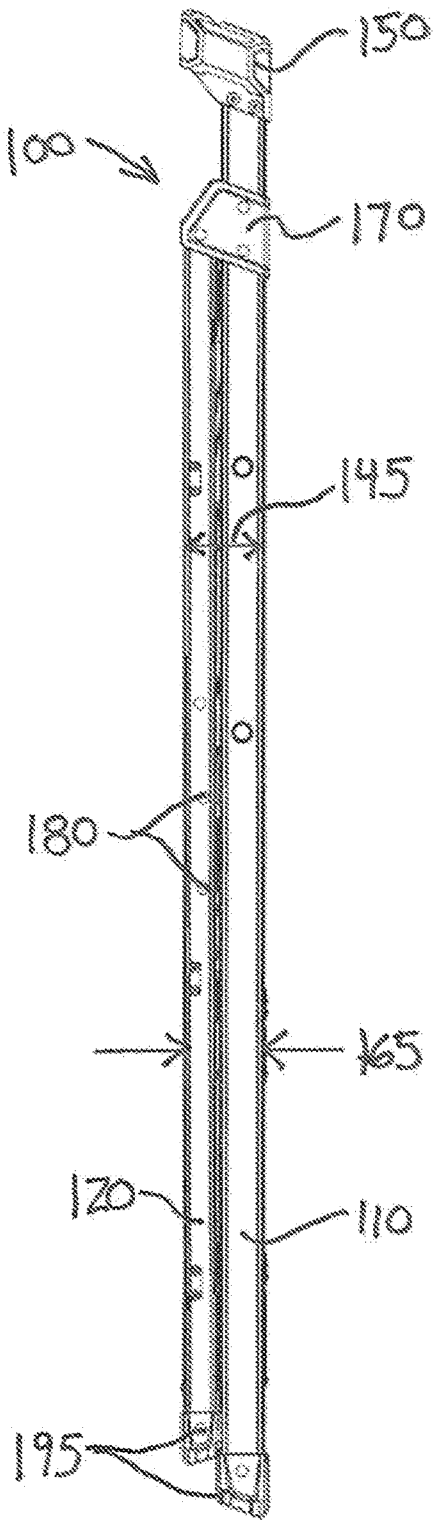
FIG. 11 is a left side elevation view of the stepladder of FIG. 8.
Figure 12:
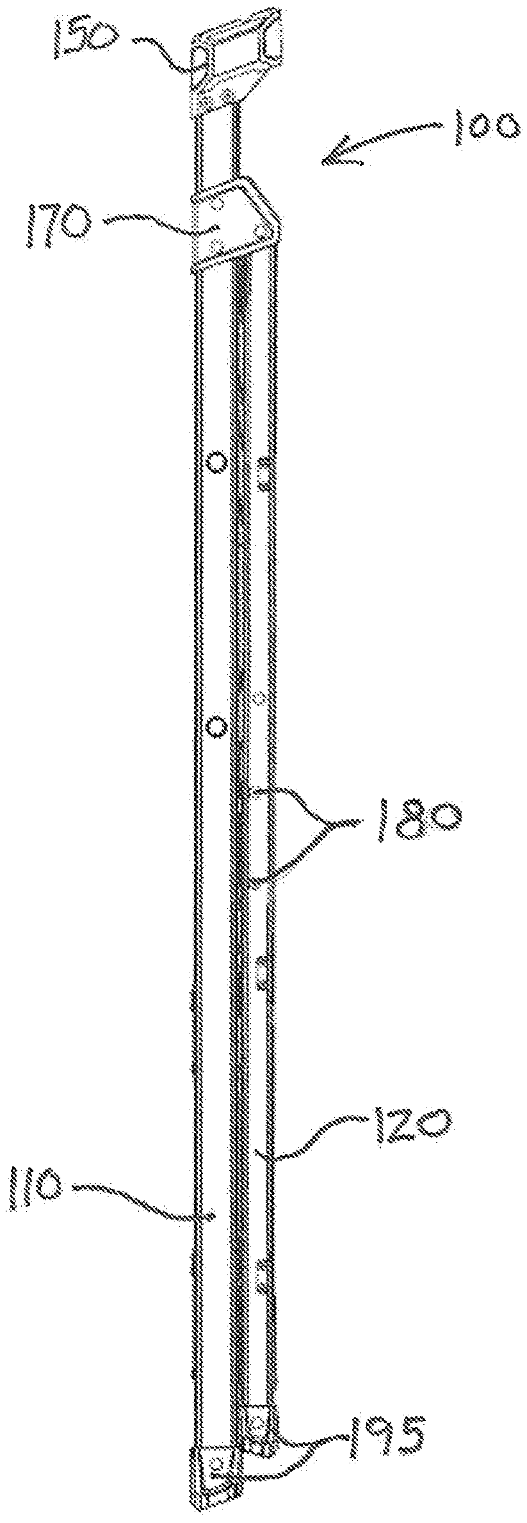
FIG. 12 is a right side elevation view of the stepladder of FIG. 8.
Figure 13:
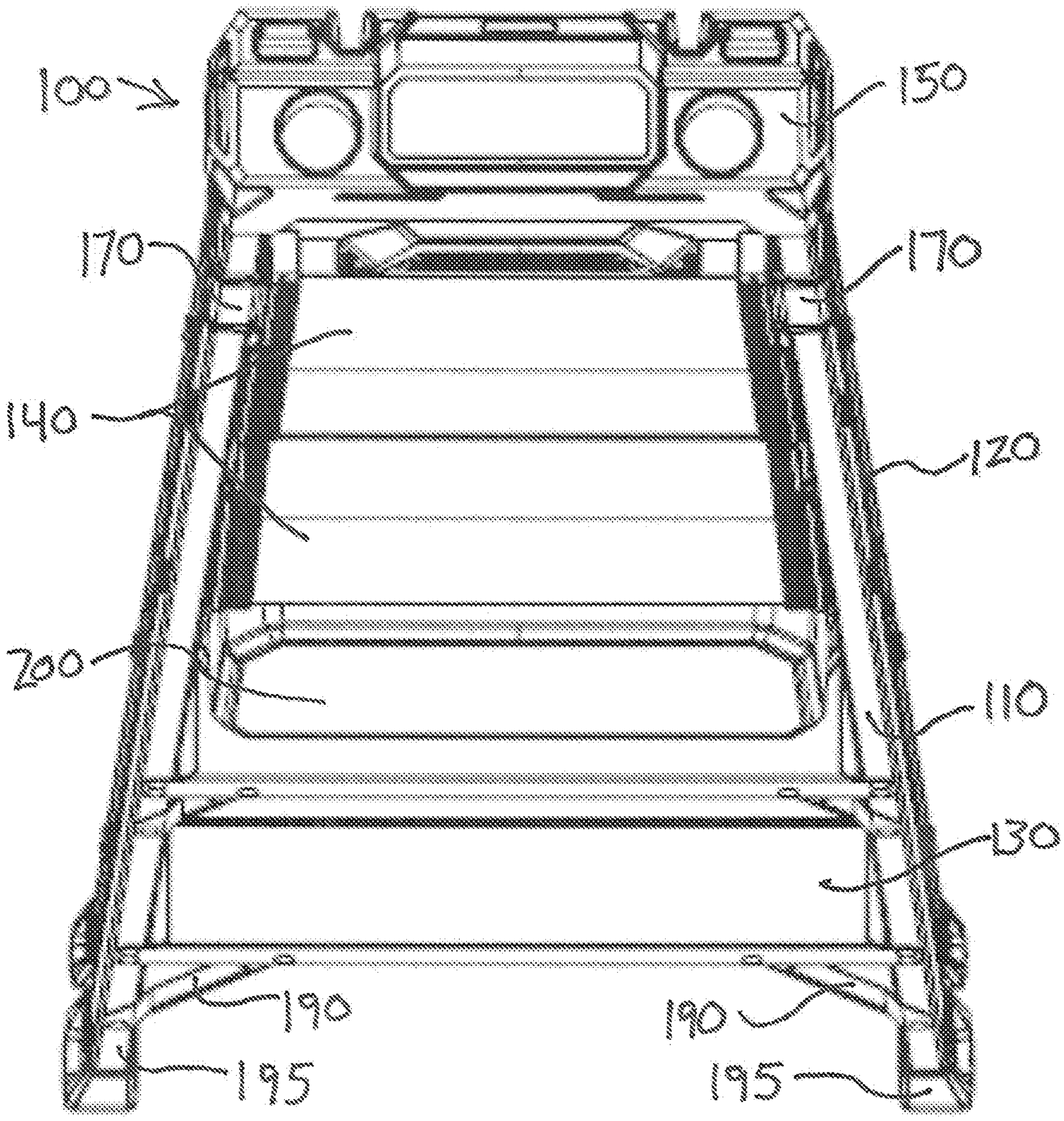
FIG. 13 is a top view of the stepladder of FIG. 8.
Figure 14:
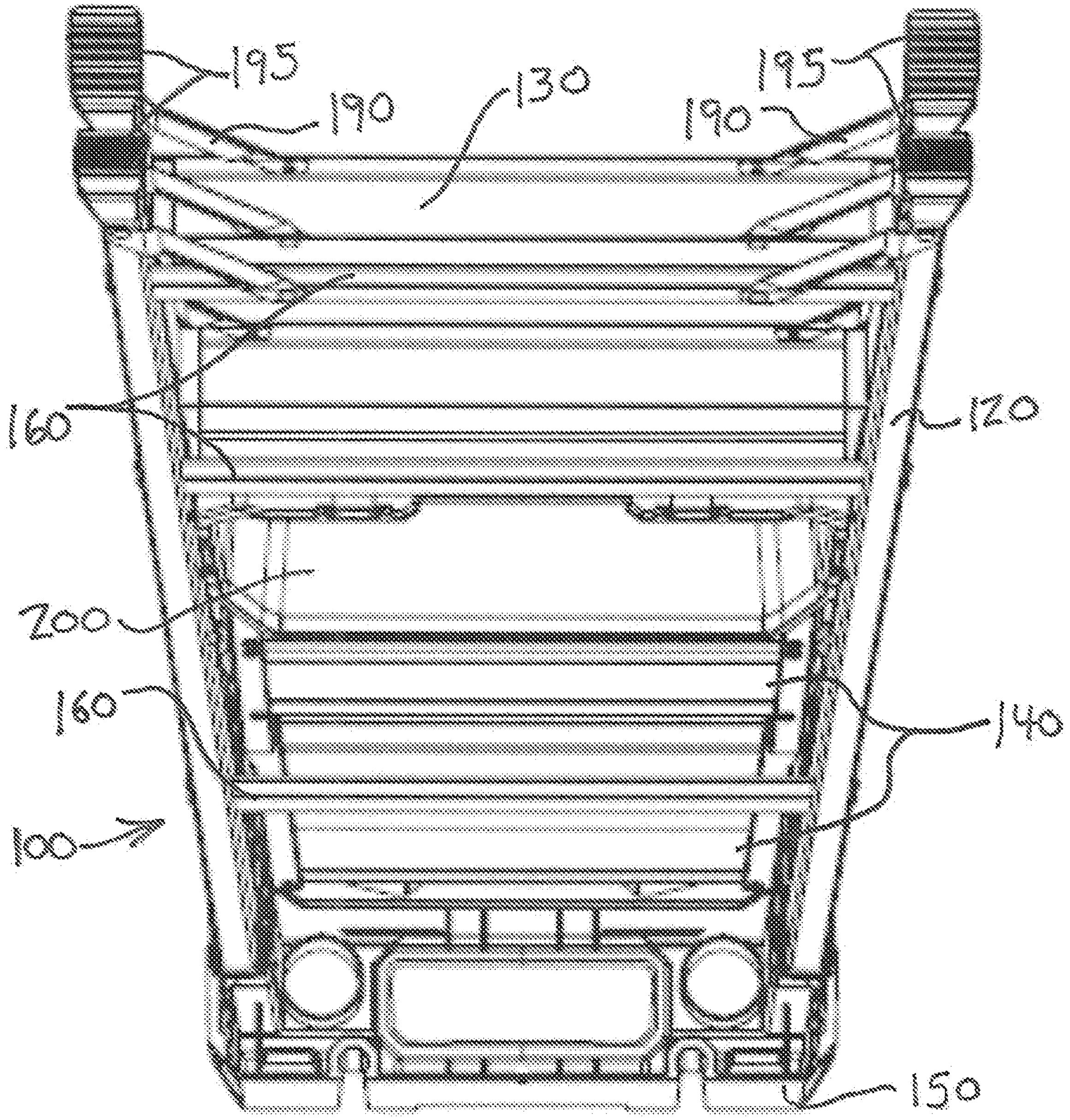
FIG. 14 is a bottom view of the stepladder of FIG. 8.
Figure 15:
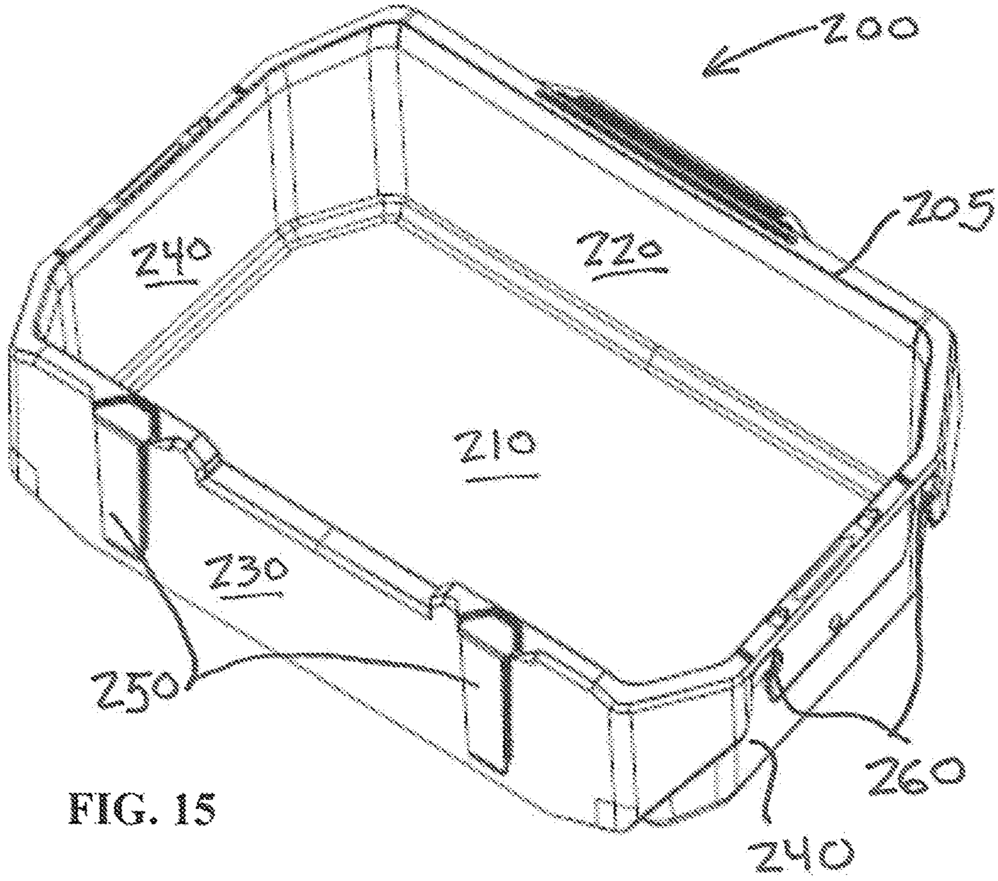
FIG. 15 is an isometric view of a tray incorporating an embodiment of the invention.
Figure 16:
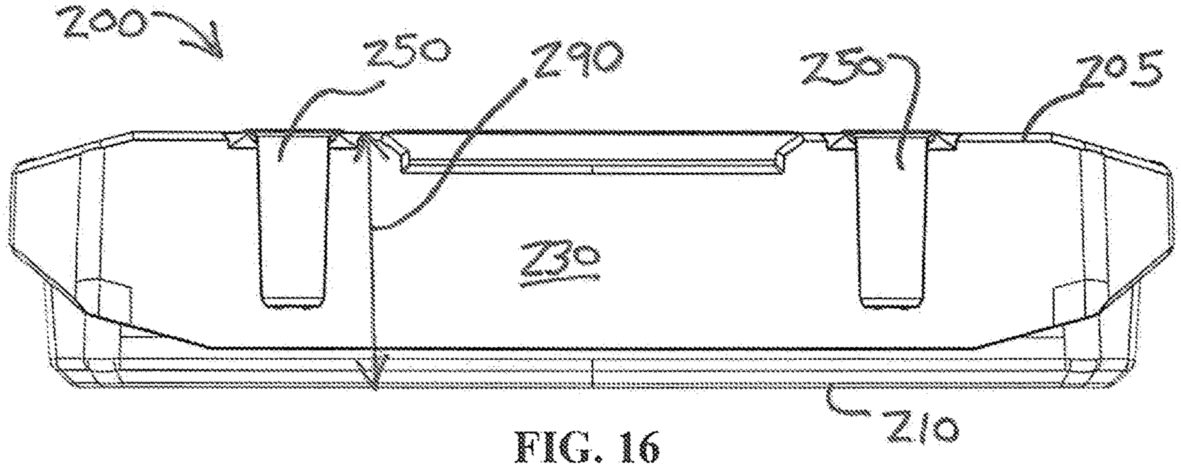
FIG. 16 is a front elevation view of the tray of FIG. 15.
Figure 17:
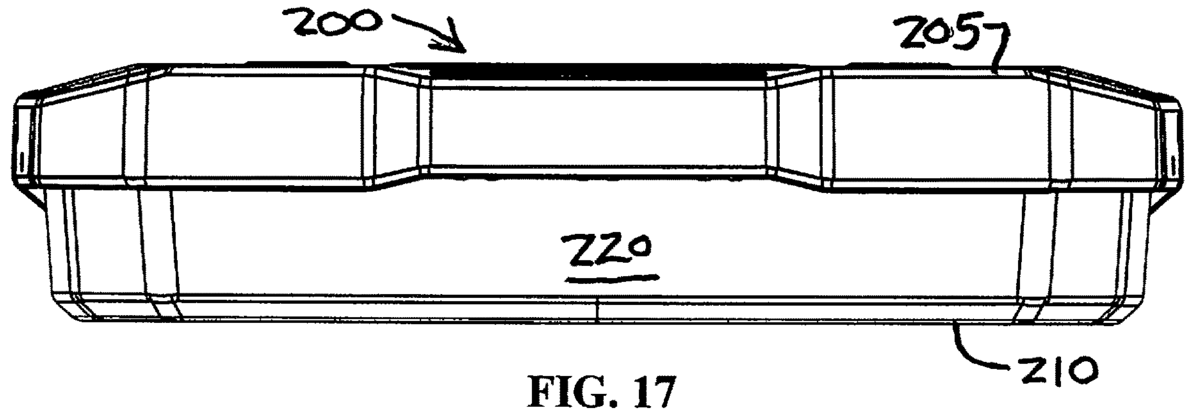
FIG. 17 is a rear elevation view of the tray of FIG. 15.
Figure 18:
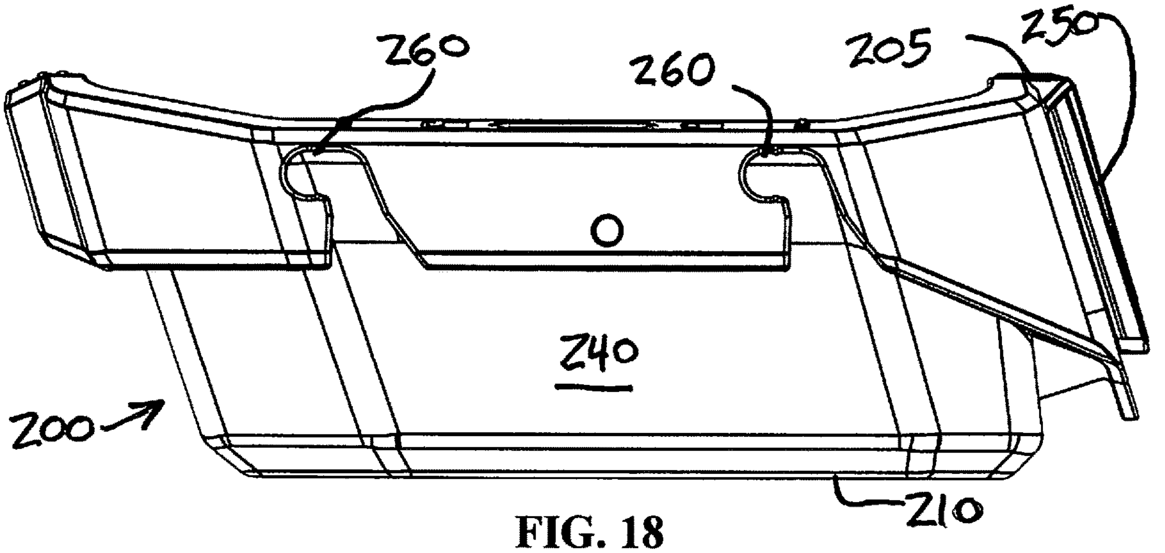
FIG. 18 is a left side elevation view of the tray of FIG. 15.
Figure 19:
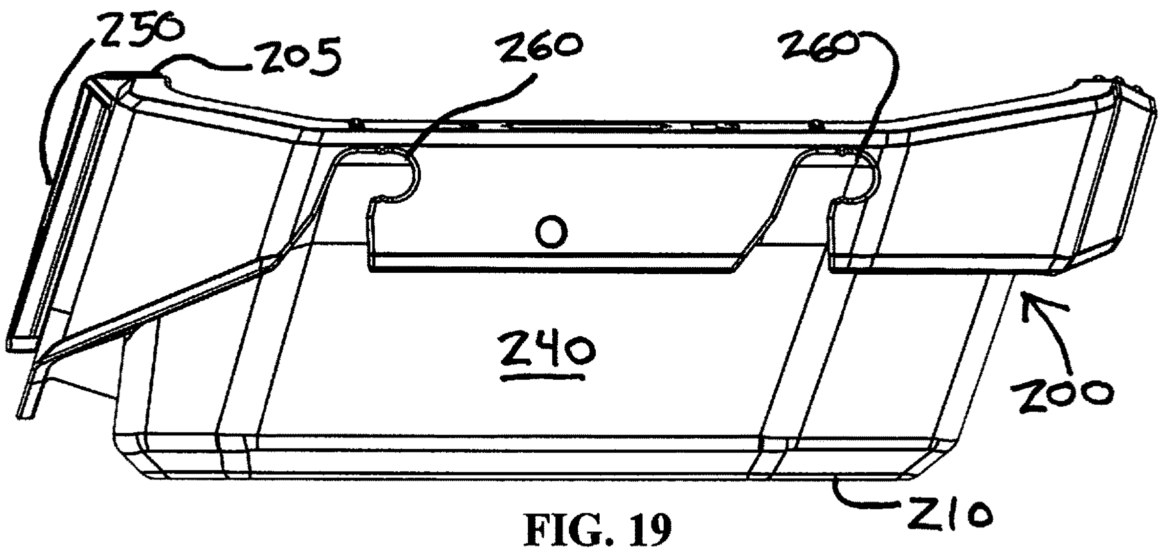
FIG. 19 is a right side elevation view of the tray of FIG. 15.
Figure 20:
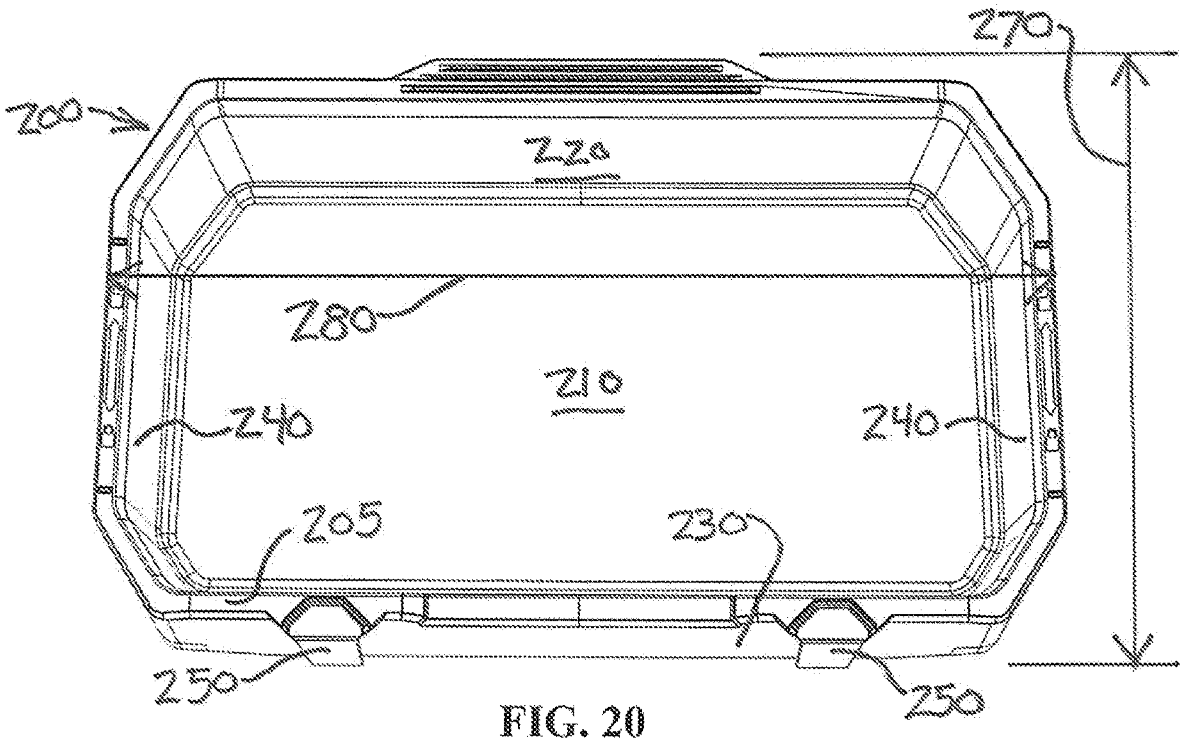
FIG. 20 is a top view of the tray of FIG. 15.
Figure 21:
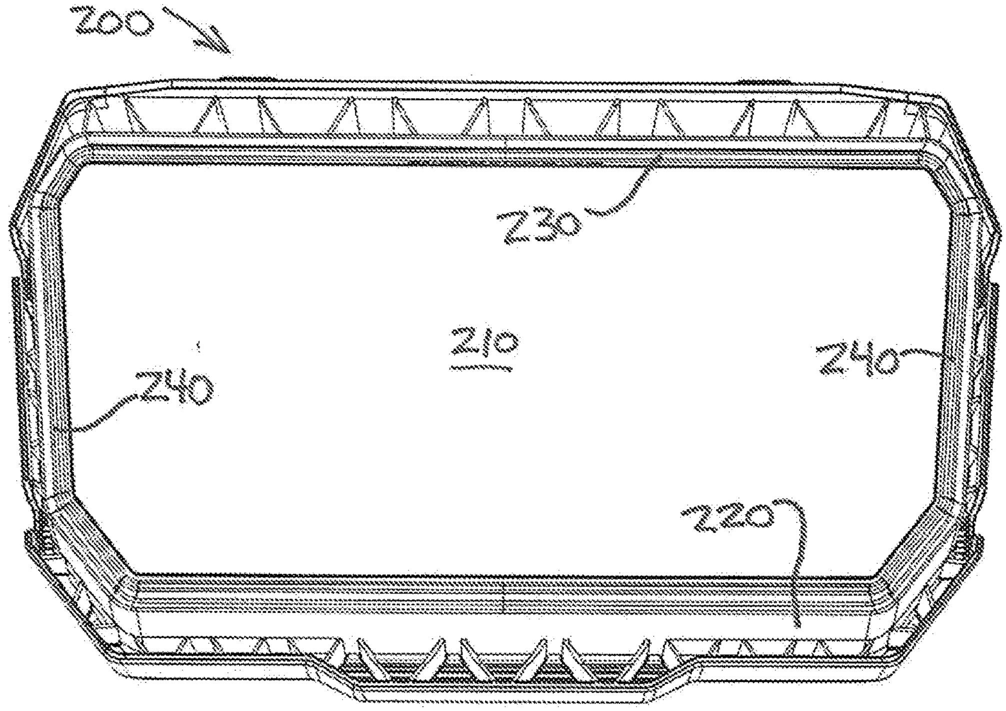
FIG. 21 is a bottom view of the tray of FIG. 15.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Attached are drawings of an embodiment of the tray of the present invention as well as detailed drawings of the individual components of the tray. It is understood that the various components disclosed in the drawings may be substituted with equivalent components and are not considered limiting.

The following detailed description should be read with reference to the drawings in which similar elements in different drawings are numbered the same. The accompanying figures depict embodiments of the tray of the present invention, and features and components thereof. Any references to front and back, right and left, top and bottom, upper and lower, and horizontal and vertical are intended for convenience of description, not to limit the present invention or its components to any one positional or spatial orientation. The drawings, which are not necessarily to scale, depict illustrative embodiments and are also not intended to limit the scope of the invention. Any reference in the claims to a "stepladder" is not intended to limit the scope of the invention to a specific type of ladder, but to any type of ladder including ladders, stepladders, step stools, podium ladders, etc.

A stepladder according to an embodiment of the invention is depicted in FIGS. 1-7 in the open or in-use position and FIGS. 8-14 in the closed or stored position by reference numeral 100. Stepladder 100 has front rails 110 and rear rails 120 with a hinge 170 between to allow the stepladder 100 to be placed in an open or in-use orientation (FIGS. 1-7) or in a closed or stored orientation (FIGS. 8-14). Stepladder 100 typically has steps 130 or rungs or a combination of the two between front rails 110 and potentially between rear rails 120. Any reference in the claims to steps is not intended to limit the scope of the invention to a specific type of step, but to any type of step, rung, platform, etc. In lieu of steps 130 or rungs between rear rails 120, cross braces 160 may be used to separate, connect, and support rear rails 120. Braces 190 may be used to further support steps 130 and cross braces 160. A top cap 150 may be added to the upper portion of the stepladder 100 to provide a work or tool storage surface and to provide a barrier to increase user safety when on the top step 130 or platform 140 of stepladder 100.

Stepladder 100 may also have one or more platforms 140 to provide a more secure standing area when stepladder 100 is in use. Platforms 140 for stepladders 100 are typically folding and rely upon links 125 to move the platform 140 from a stored configuration to an in-use configuration. Stepladders 100 also commonly have a foot 195 on the end of the front rails 110 and rear rails 120 to protect surfaces onto which the stepladder 100 is placed and to provide a wider footprint and better traction for the stepladder 100.

Figure 29:
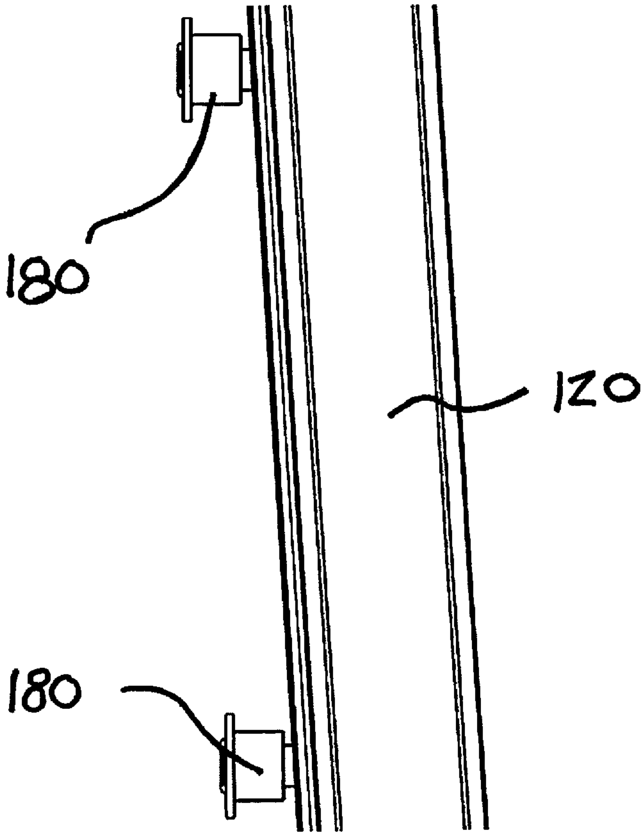
FIG. 29 is detail view of the hoist drum assembly of FIG. 4 taken at arc A-A.

In one embodiment, a tray 200 is adapted to be removably attached to the stepladder 100. In the embodiment depicted in FIGS. 1-14, the tray 200 is removably attached to the ladder top cap 150 or to a tray storage stud 180 (detail provided in FIG. 29). In FIGS. 1-7, the tray 200 is in its use position and in FIGS. 8-14 the tray is in its stored position. FIGS. 15-21 present illustrations of an embodiment of a tray 200 according to the invention. The tray 200 will typically comprise a front wall 220, a rear wall 230, side walls 240, and a bottom 210. The tray also has a top surface 205 that may be the uppermost extent of the tray 200. Top cap 150 may also have various features including a tool orifice 156 for holding tools or materials, a recess 157 for holding or storing materials, or a tray hook 158 for hanging tools or materials. Top cap also comprises side walls 153 and recess floor 159.

Alternatively, instead of a top cap 150, stepladder 100 may merely have a frame or handles at the top of the rails 110, 120. In such a situation, another embodiment of the invention contemplates the tray 200 being removably attached to the frame or handles in lieu of to the top cap 150.

Tray 200 has a height dimension 270 that represents the outermost dimension of the tray 200 between the exterior of the front wall 220 and exterior of the rear wall 230 in a front-to-back direction, a width dimension 280 that represents the outermost dimension of the tray 200 between exterior of the side walls 240, and a depth dimension 290 that represents the outermost dimension of the tray 200 in a direction between the top surface 205 and exterior of the bottom 210. The combination of these dimensions 279, 280, 290 define the outer boundary of the tray 200

Figure 22:
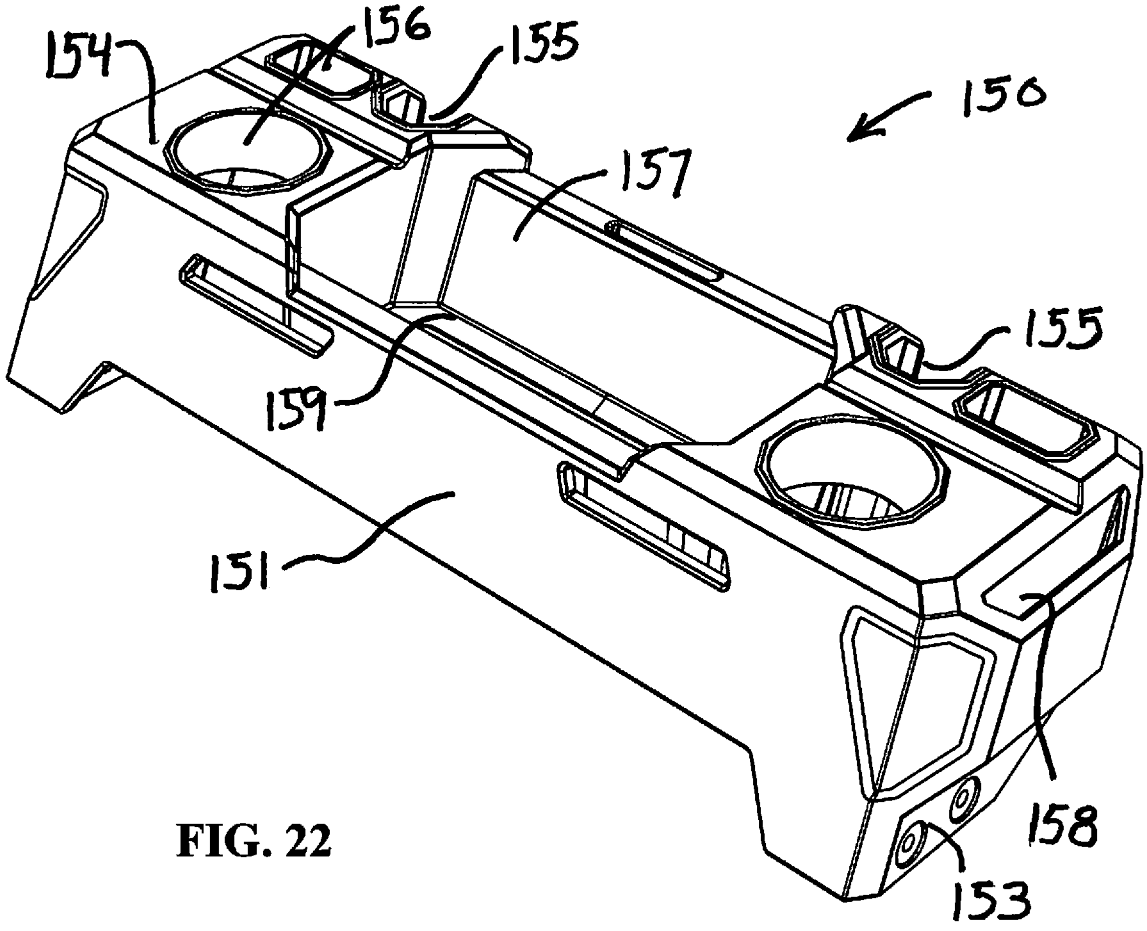
FIG. 22 is an isometric view of a stepladder top cap incorporating an embodiment of the invention.
Figure 23:
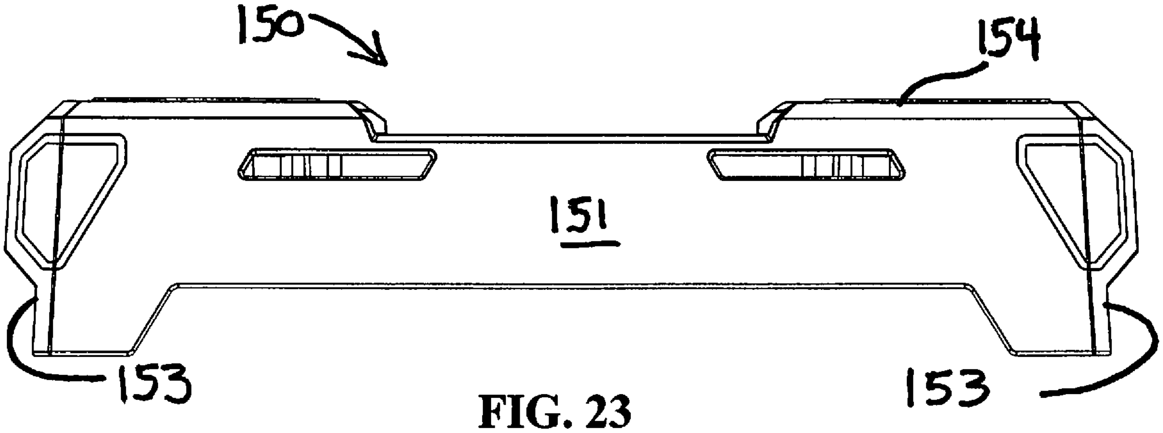
FIG. 23 is a front elevation view of the stepladder top cap of FIG. 22.
Figure 24:
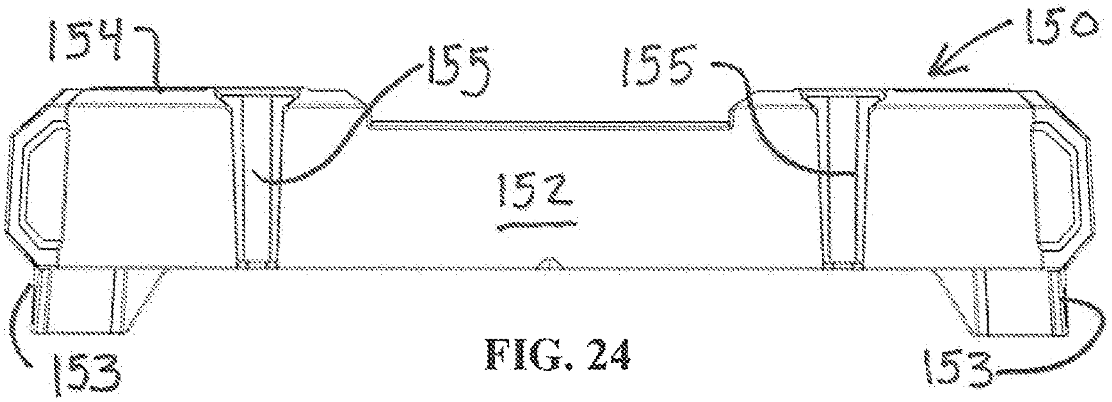
FIG. 24 is a rear elevation view of the stepladder top cap of FIG. 22.
Figure 25:
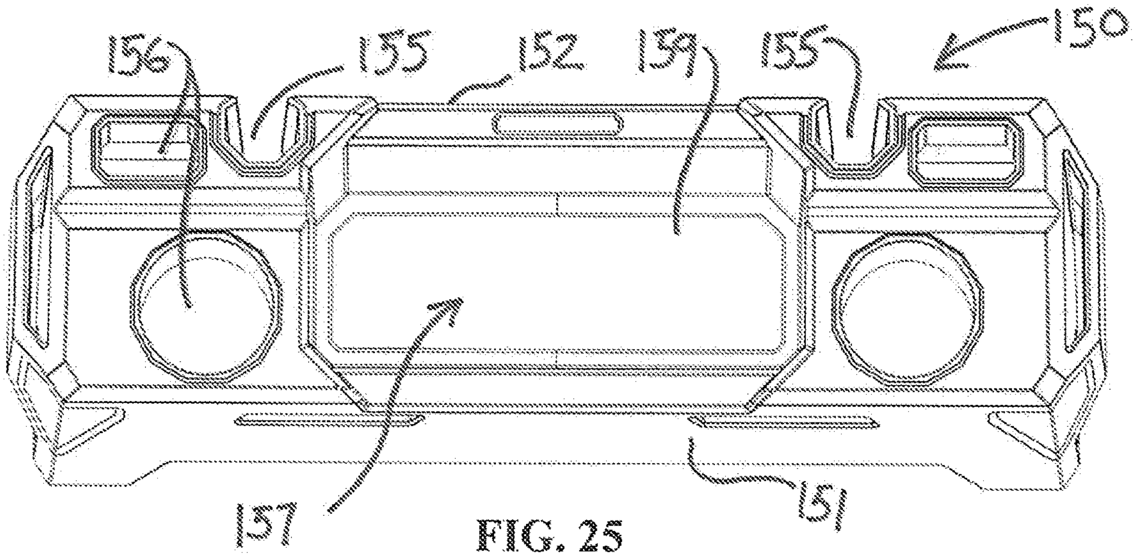
FIG. 25 is a top view of the stepladder top cap of FIG. 22.
Figure 26:
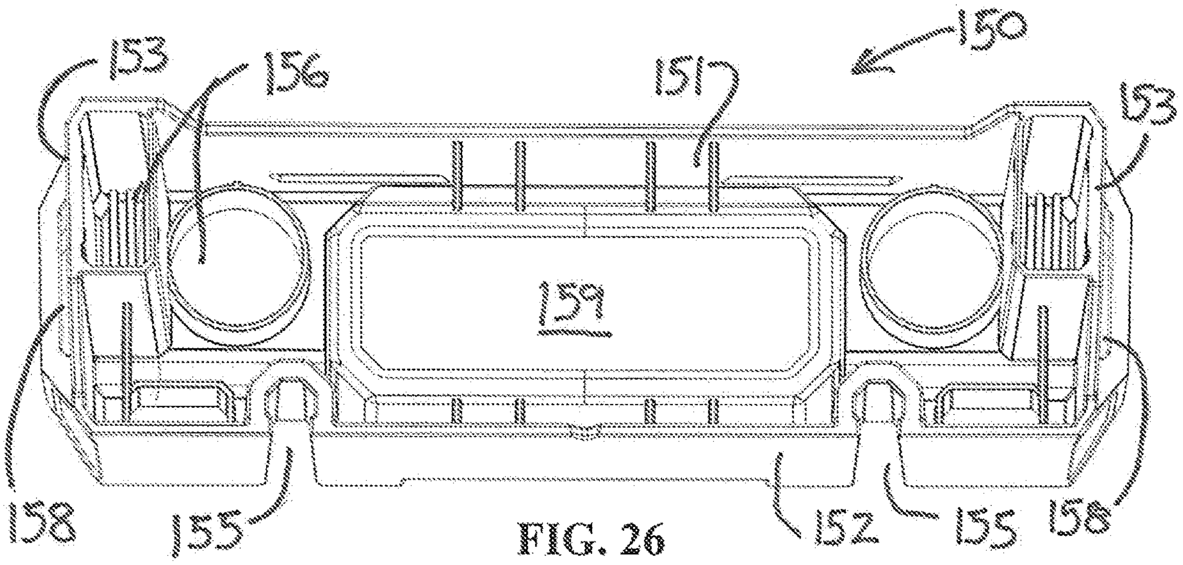
FIG. 26 is a bottom view of the stepladder top cap of FIG. 22.
Figure 27:
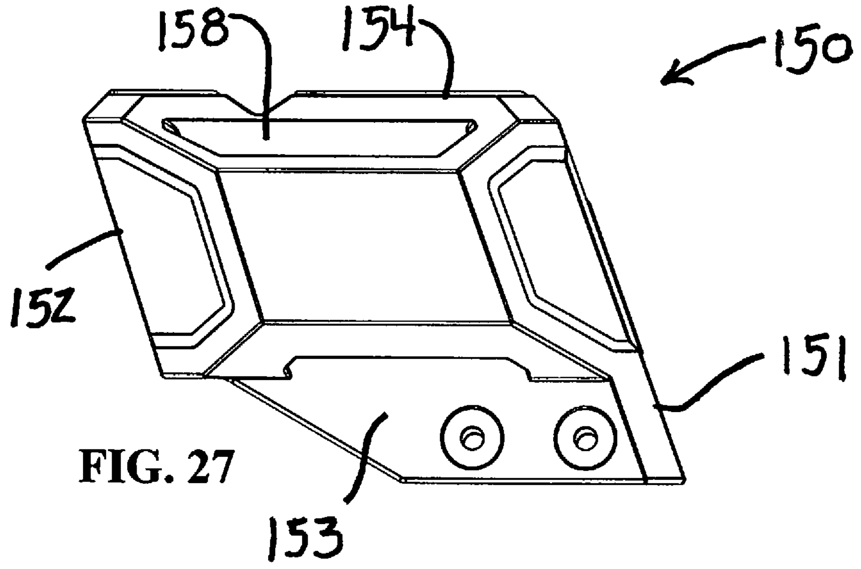
FIG. 27 is a left side elevation view of the stepladder top cap of FIG. 22.
Figure 28:
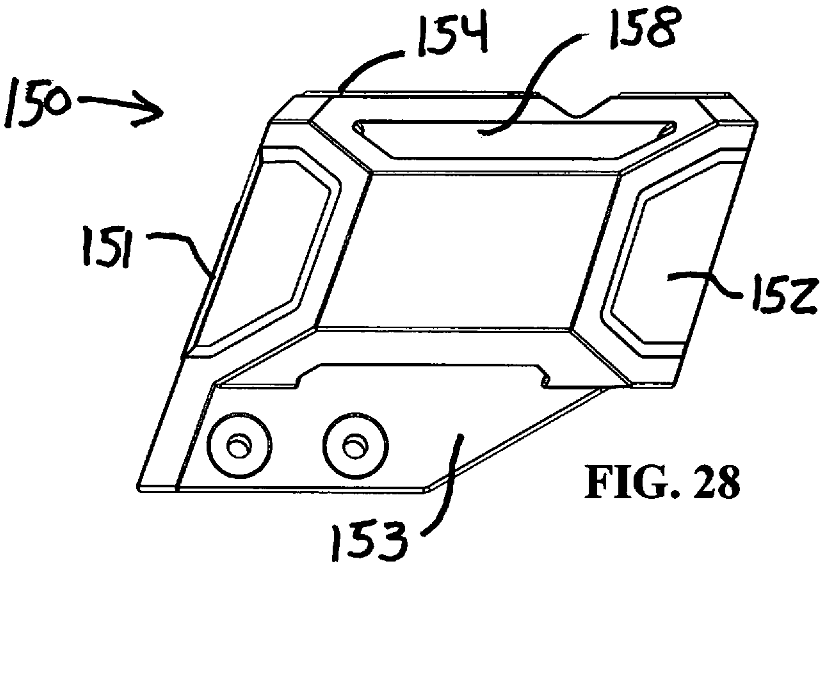
FIG. 28 is a right side elevation view of the stepladder top cap of FIG. 22.

In the embodiment depicted in FIGS. 1-21, tray 200 forms a single interior storage area between the walls 220, 230, 240 and the bottom 210. However, other embodiments may include multiple storage areas or work areas by including additional walls (not shown). Tray 200 also includes one or more prongs 250 adapted to mate within corresponding prong slots 155 on top cap 150 (see FIG. 22) for placing the tray 200 in the use position (as shown in FIGS. 1-7). Other means of attaching tray 200 to top cap 150 are contemplated and within the scope of the invention (e.g., studs on the top cap 150 and stud slots on the tray rear wall 230).

To increase the strength and stability between the tray 200 and top cap 150, the preferred embodiment of the tray back wall 230 and top cap back wall 152 are parallel and abut each other when the tray 200 is attached to the top cap 150. This arrangement provides an additional support for load bearing in addition to the prongs 250. It is also contemplated that the tray back wall 230 and/or top cap back wall 152 have other structure such as ribs or struts that allow the two parts to abut for additional support and stability.

Tray 200 further includes means of attaching the tray 200 to stepladder 100 when not in use. In the embodiment depicted in FIGS. 1-21, stud slots 260 are formed in the side walls 240 of tray 200 that accept studs 180 to attach tray 200 to stepladder 100 in a stored position (see FIGS. 8-14). The studs may be attached to the various ladder parts (front rail 110, rear rail 120, steps 130 (or rungs), or platform 140 by any method known in the art, such as by rivets. Other means of attaching tray 200 to stepladder 100 are contemplated and within the scope of the invention. For example, Velcro or slots in the stepladder 100 that accept an extension on the tray 200. Other means of attaching the tray 200 to the stepladder for storage include magnets, prongs 250 on the top cap 150 and prong slots 155 in the tray 200 for attaching the tray 200 in the use position; prongs 250 on the tray 200 and prong slots 155 on the ladder 100 for attaching the tray 200 in the stored position; plastic clips on the tray 200 that snap onto the rungs steps 130, rails 110, 120, or the top cap 150; the tray 200 could nest between top rungs on an articulated ladder in the use position; the tray 200 can attach to the front rails 110 or rear rails 120 in the use position; or the tray 200 could attach to the back wall of a platform 140 or step 130 in the use position To facilitate storage of the tray 200 when not in use and to not increase the amount of storage space required an embodiment of the tray 200 fits within the boundaries of the stepladder 100 when the stepladder 100 is in the closed or stored orientation. In this embodiment, the tray height dimension 270 is less than the step gap dimension 115, the tray width dimension 280 is less than the stepladder rail interior width dimension 135 at the location where the tray 200 is in its stored position (FIGS. 8-14), and the tray depth dimension 290 is less than the combined rail depth dimension 145. These dimensions also allow the tray 200 to be stored when the stepladder 100 is in the open or in-use orientation. A preferred embodiment includes the front rails 110 and rear rails 120 forming a combined rail boundary 165 into which the entirety of the tray 200 rests within the combined rail boundary when the tray 200 is attached to the stepladder 100 when not in use.

It the preferred embodiment, tray top surface 205 is parallel with top cap top surface 154 when the tray 200 is attached to the top cap 150.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. A ladder tray system comprising:

a ladder having an open orientation and a closed orientation comprising:
 front rails;
 rear rails;
 steps;
 a top cap fixed to one of the front rails or rear rails comprising a prong slot;
 a tray storage stud;
 a rail interior width dimension at the location of the storage stud; and
 a combined rail depth dimension at the location of the storage stud when the ladder is in the closed orientation; and
a tray comprising:
 a rear wall;
 a side wall;
 a top surface;
 a prong proximate the rear wall;
 a stud slot proximate the side wall and distal the top surface; and
 a maximum width dimension;
 a maximum depth dimension:
wherein the tray is removably attachable to the top cap by insertion of the prong into the prong slot in an in-use configuration;
wherein the tray is removably attachable to the tray storage stud by insertion of the tray storage stud into the stud slot in a storage configuration; wherein in the storage configuration the tray is positioned coplanar with and not protruding from a plane of the front and rear rails within the combined rail depth dimension;
wherein the top cap comprises a back wall and wherein the top cap back wall abuts and is coplanar with the tray back wall when the tray is attached to the top cap; and
wherein the tray maximum width dimension at the location of the storage stud is less than the ladder rail interior width dimension.

2. The ladder tray system of claim 1 wherein the tray storage stud is connected to one of said rear rails.

3. The ladder tray system of claim 1 wherein the tray storage stud is connected to one of said front rails.

4. The ladder tray system of claim 1 wherein the top cap back wall and the tray back wall are parallel when the tray is attached to the top cap.

5. The ladder tray system of claim 1 wherein the tray maximum depth dimension is less than the combined rail depth dimension at the location of the storage stud.

6. A tray in combination with a ladder, the tray comprising:

a rear wall;
a side wall;
a top surface;

a stud slot proximate the side wall and distal the top surface;
a maximum width dimension; and
a maximum depth dimension;
wherein the tray has a use position and a stored position and is removably attachable to the ladder, the ladder having an open orientation and a closed orientation comprising:
a tray storage stud;
front rails;
rear rails;
steps;
a top cap fixed to one of the front rails or rear rails;
a rail interior width dimension at the location of the tray storage stud; and
a combined rail depth dimension at the location of the tray storage stud when the ladder is in the closed orientation;
wherein the tray is removably attachable to the top cap in the use position and removeably attachable to the ladder tray storage stud in the stored position and wherein in the stored position the tray is positioned coplanar with and not protruding from a plane of the front and rear rails within the combined rail depth dimension; and
wherein the tray maximum width dimension is less than the rail interior width dimension at the location of the tray storage stud.

7. The tray in combination with the ladder of claim 6 wherein the top cap comprises prong slots and the tray comprises prongs and each top cap prong slot is sized to fit a respective tray prong.

8. The tray in combination with the ladder of claim 6 wherein the tray stud slot is removably attachable to the ladder tray storage stud.

9. The tray in combination with the ladder of claim 8 wherein the top cap comprises a back wall and wherein the top cap back wall abuts and is coplanar with a tray back wall when the tray is attached to the top cap.

10. The tray in combination with the ladder of claim 9 wherein the tray maximum depth dimension is less than the combined rail depth dimension at the location of the tray storage stud.

* * * * *